United States Patent [19]
Ostwald

[11] Patent Number: 5,236,296
[45] Date of Patent: Aug. 17, 1993

[54] ROBOTIC HAND MECHANISM

[75] Inventor: timothy C. Ostwald, Louisville, Colo.

[73] Assignee: Storage Technology Corporation, Louisville, Colo.

[21] Appl. No.: 823,176

[22] Filed: Jan. 21, 1992

[51] Int. Cl.⁵ .................................... B65G 1/04
[52] U.S. Cl. ................... 414/280; 414/753; 901/31
[58] Field of Search ............... 414/277, 280, 282, 661, 414/740, 753, 416, 331, 273; 901/31; 360/92; 369/34, 35

[56] References Cited

U.S. PATENT DOCUMENTS

| | | | |
|---|---|---|---|
| 3,362,545 | 1/1968 | Rowe | 414/753 |
| 4,462,742 | 7/1984 | Hradel | 414/753 X |
| 4,615,429 | 10/1986 | Arase | 414/280 X |
| 4,637,243 | 1/1987 | Bond | 414/753 X |
| 4,984,107 | 1/1991 | Mondocea et al. | 414/280 X |
| 5,015,139 | 5/1991 | Baur | 414/280 X |
| 5,059,089 | 10/1991 | Kocaoglan | 414/753 X |
| 5,101,387 | 3/1992 | Wanger et al. | 414/280 X |
| 5,139,384 | 8/1992 | Tuttobene | 414/280 X |

FOREIGN PATENT DOCUMENTS 990101 4/1965 United Kingdom ............... 414/280

*Primary Examiner*—David A. Bucci
*Attorney, Agent, or Firm*—Duft, Graziano & Forest

[57] ABSTRACT

The continuous operation robotic hand mechanism of the present invention is used in a robotic object handling system and makes use of a crank mechanism attached to the gripper mechanism carriage in order to enable the drive motor to continuously operate throughout the entire carriage movement and object retrieval operations. This apparatus is configured to minimize the acceleration and deceleration required to operate the carriage mechanism as well as provide a pause of predetermined duration once the carriage has reached its furthest extent of travel in order to provide sufficient time for the finger gripper mechanism to be activated to grasp the object stored in a selected object storage location. This entire operation takes place without interrupting the operation of the drive motor to thereby minimize the power consumption, increase the speed of operation of the hand mechanism, and reduce the wear on the motor and associated components.

14 Claims, 8 Drawing Sheets

5,236,296

ROBOTIC HAND MECHANISM

FIELD OF THE INVENTION

This invention relates to robotic object handling systems and, in particular, to an improved robotic hand mechanism for retrieving objects from object storage locations.

PROBLEM

It is a problem in the field of robotic object handling systems to efficiently retrieve the objects from the plurality of object storage locations contained within the object handling system. The object handling mechanism typically consists of an arm used to position the object retrieval mechanism in front of a selected object storage location. The object retrieval mechanism itself includes a finger gripper mechanism to grasp the object securely in order to retrieve it from its storage location. The extraction of the object from the object storage location is accomplished by a hand mechanism which functions to extend the finger gripper mechanism from a retracted position into a position where it is juxtaposed to and in contact with the object to be retrieved from the object storage location. Once the hand mechanism fully extends the finger gripper mechanism, the finger gripper mechanism is closed on the object in order to securely grasp the object. The hand mechanism then extracts the object from its object storage location by retracting the finger gripper mechanism to its fully retracted position.

Prior art finger gripper mechanisms typically make use of a motor and a lead screw in order to linearly drive the finger gripper mechanism to and from the object storage location. The finger gripper mechanism is typically attached to a carriage which rides on a pair of guide rails in order to define the path of motion of the finger gripper mechanism from its fully retracted position to its fully extended position. The motor and lead screw mechanism function to transport the carriage along these guide rails in order to effectuate the finger gripper motion. A difficulty with the motor and lead screw configuration is that the motor must cycle through two acceleration and deceleration cycles for each object retrieval operation that takes place in the system. In particular, the carriage with its attached finger gripper mechanism is stationary at either end of its full range of travel. Therefore, the motor must be turned on in order to begin the motion of the carriage from its terminal travel position. The motor gradually accelerates the carriage to a terminal velocity at which it travels along the path defined by the guide rails. As the carriage reaches a location a predetermined distance from the end of the path of travel, the power applied to the drive motor is reduced in order to decelerate the carriage to slow the motion of the carriage until it finally comes to rest in its other terminal position. The power is then switched off to the motor until the return cycle of travel is initiated. Thus, the entire acceleration and deceleration cycle is repeated twice to transport the carriage between its fully extended position and its fully retracted position along this predefined path of travel on every object retrieval cycle. Therefore, a significant amount of power is required to overcome the inertia of the motor, lead screw mechanism, as well as the carriage and gripper mechanism when these objects are at rest in order to achieve the velocity required to transport the finger gripper mechanism along the path of travel. Due to the limited range of motion of a typical hand mechanism, and the need for the robotic object handling system to operate as quickly as possible, the acceleration and deceleration curves tend to be fairly steep and the motor required to operate this mechanism consumes a significant amount of power to achieve these accelerations and decelerations.

Therefore, in a hand mechanism for a robotic object handling system, it is desirable to have the speed of operation maximized while the power consumption necessary to achieve this motion is minimized. In addition, it is desirable to minimize the number of start and stop cycles for the motor since this places additional wear on the motor as well as consumes a significant amount of power.

SOLUTION

The above described problems are solved and a technical advance achieved in the field by the continuous operation robotic hand mechanism of the present invention. This apparatus is used in a robotic object handling system and makes use of a crank mechanism attached to the gripper mechanism carriage in order to enable the drive motor to continuously operate throughout the entire carriage movement and object retrieval operations. This apparatus is configured to minimize the acceleration and deceleration required to operate the carriage mechanism as well as provide a pause of predetermined duration once the carriage has reached its furthest extent of travel in order to provide sufficient time for the finger gripper mechanism to be activated to grasp the object stored in a selected object storage location. This entire operation takes place without interrupting the operation of the drive motor to thereby minimize the power consumption, increase the speed of operation of the hand mechanism, and reduce the wear on the motor and associated components.

In the preferred embodiment, the drive motor drives a continuous belt which operates a substantially cylindrical pulley in order to rotate the pulley continuously during the entire object retrieval cycle of the object retrieval mechanism. A crank interconnects the pulley with a carriage that supports the finger gripper mechanism. One end of the crank is connected to the pulley at a location proximate to the circumference of the pulley while the other end of the crank is connected to the carriage in order to drive the carriage linearly along a predefined path of travel, as defined by the guide rails on which the carriage rides As the drive motor rotates its drive shaft, a drive gear affixed to the drive shaft causes rotation of a continuous belt which is looped around the pulley. As the pulley rotates, the one end of the crank that is connected to the pulley traverses a circle that substantially matches the circumference of the pulley. This circular motion of the one end of the crank causes the other end of the crank to transport the carriage in a linear direction along its full range of motion in a piston fashion. The mechanism is designed to also provide a predetermined pause in the linear motion of the carriage at its full extent of travel, which pause corresponds to the pulley and crank interconnection reaching a location proximate to the cartridge storage location.

DETAILED DESCRIPTION

The continuous operation robotic hand mechanism of the present invention is used in a robotic object handling system and makes use of a crank mechanism attached to the gripper mechanism carriage in order to enable the drive motor to continuously operate throughout the entire carriage movement operation. This apparatus is configured to minimize the acceleration and deceleration required to operate the carriage mechanism as well as provide a pause of predetermined duration once the carriage has reached its furthest extent of travel in order to provide sufficient time for the finger gripper mechanism to be activated to grasp the object stored in a selected object storage location. This entire operation takes place without interrupting the operation of the drive motor to thereby minimize the power consumption, increase the speed of operation of the hand mechanism, and reduce the wear on the motor and associated components.

Figure 8:
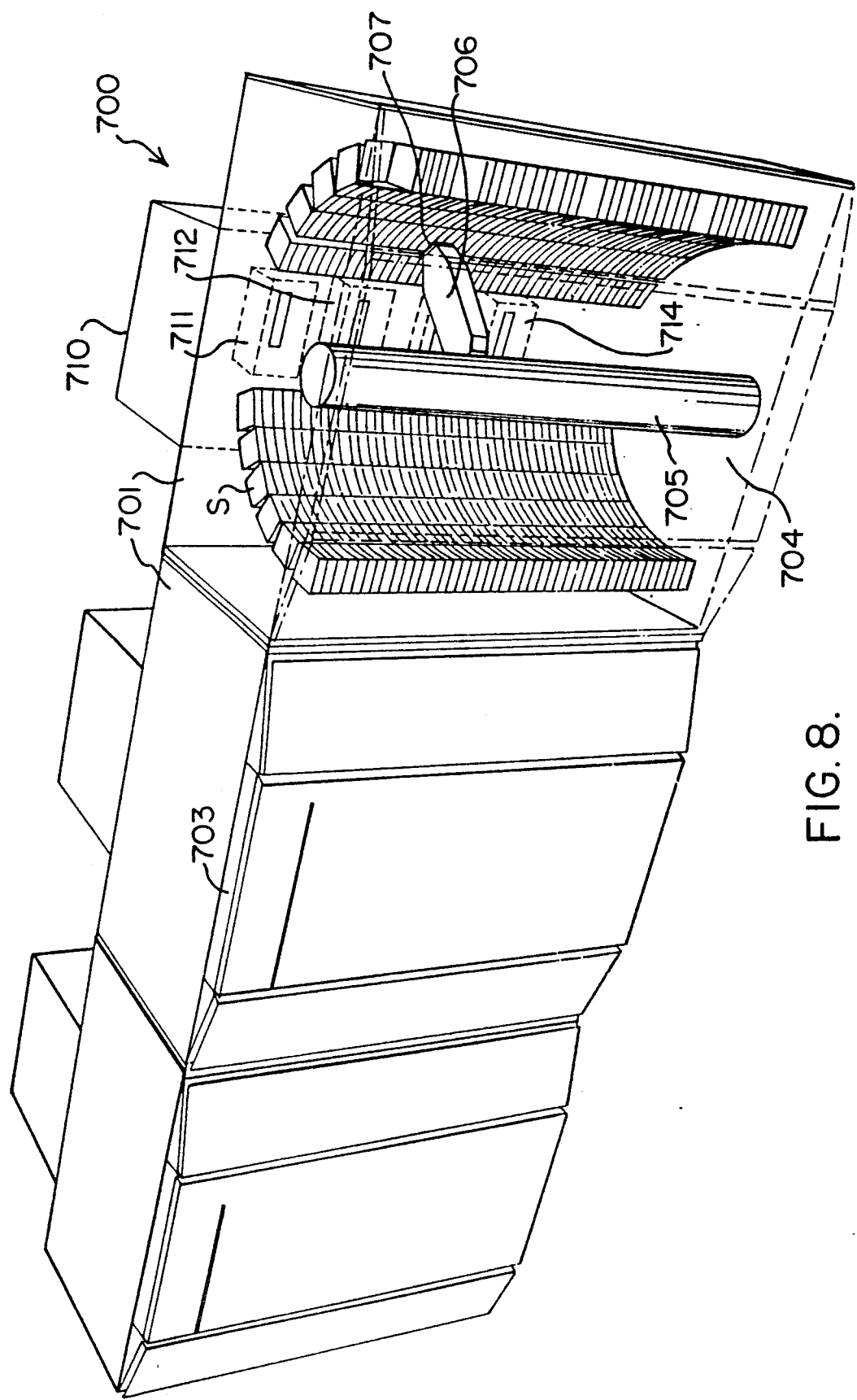
FIG. 8 illustrates a typical robotic cartridge handling system in which this apparatus may be installed.

FIG. 8 illustrates a perspective view of a typical automated magnetic tape cartridge storage system 700. The basic architecture of this robotic cartridge storage system 700 is that of a center pivot robotic cartridge handling mechanism 704 surrounded by a polygonal array of radially inwardly disposed cartridge storage locations S, which polygonal array piecewise approximates a half cylinder. In particular, the robotic cartridge handling mechanism 704 consists of a center pivot 705 with a positioning arm 706 rotatably attached thereto. A magnetic tape cartridge retrieval mechanism 707 is located at the distal end of the positioning arm 706 and consists of a finger gripper mechanism that is extendable in a radial direction to grasp a magnetic tape cartridge stored in a selected one of the cartridge storage locations S. A drive motor (not shown) is included in the center pivot 705 in order to enable the positioning arm 706 to rotate about the center pivot 705 and position the retrieval mechanism 707 in front and juxtaposed to a selected one of the magnetic tape cartridge storage locations in the cylindrical array of storage locations.

Once the cartridge in the selected cartridge storage location is securely grasped by the gripper mechanism 707, the gripper mechanism 707 is retracted in a radial direction by a tractor mechanism to retrieve the magnetic tape cartridge from its associated cartridge storage location S. Once the cartridge is so retrieved, the positioning arm 706 translates the retrieval mechanism 707 to a position in front and juxtaposed to one of the magnetic tape drives 711-714 that is included in this cartridge storage system 700. Again, the tractor mechanism is activated to extend the finger gripper mechanism 707, with the magnetic tape cartridge held between its fingers, toward the selected one of the tape drives 711-714 in order to insert the magnetic tape cartridge therein. Once the magnetic tape cartridge is firmly placed in the tape drive, the finger gripper mechanism 707 releases its hold on the magnetic tape cartridge and the tractor mechanism retracts the finger gripper mechanism to clear the tape drive and proceed with another cartridge transportation operation.

This basic robotic cartridge handling mechanism and its functional operation are well known in the prior art and are not disclosed in any additional detail herein. Suffice it to say that the robotic cartridge handling mechanism is rotatably operable to transport magnetic tape cartridges between their cartridge storage locations S and the plurality of magnetic tape drives 711-714 and cartridge input/output ports (if any) which function as a mechanism to input and output magnetic tape cartridges into this cartridge storage system 700.

Gripper Mechanism Hand Architecture

Figure 1:
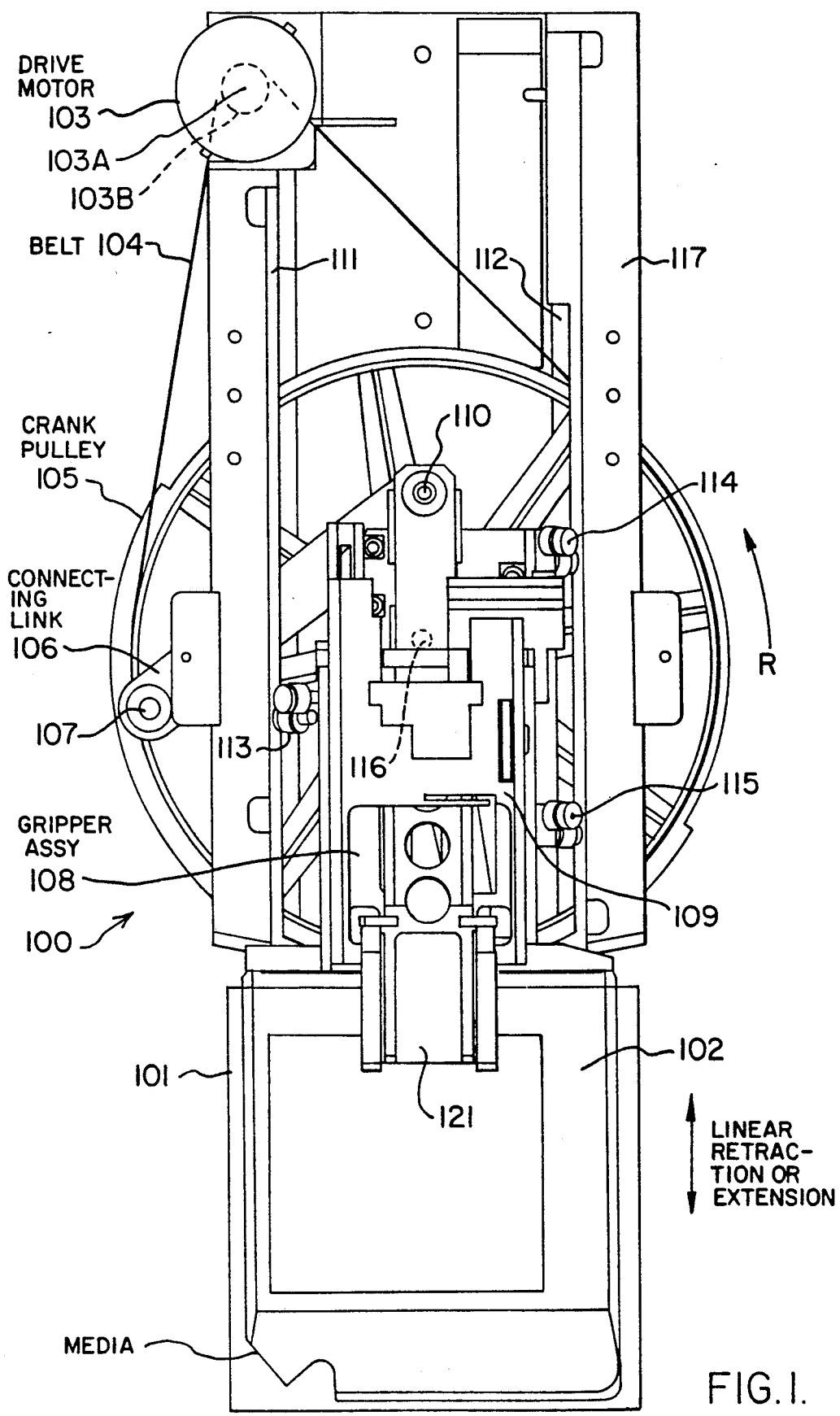
FIG. 1 illustrates a top view of the gripper hand apparatus of the present invention.
Figure 2:
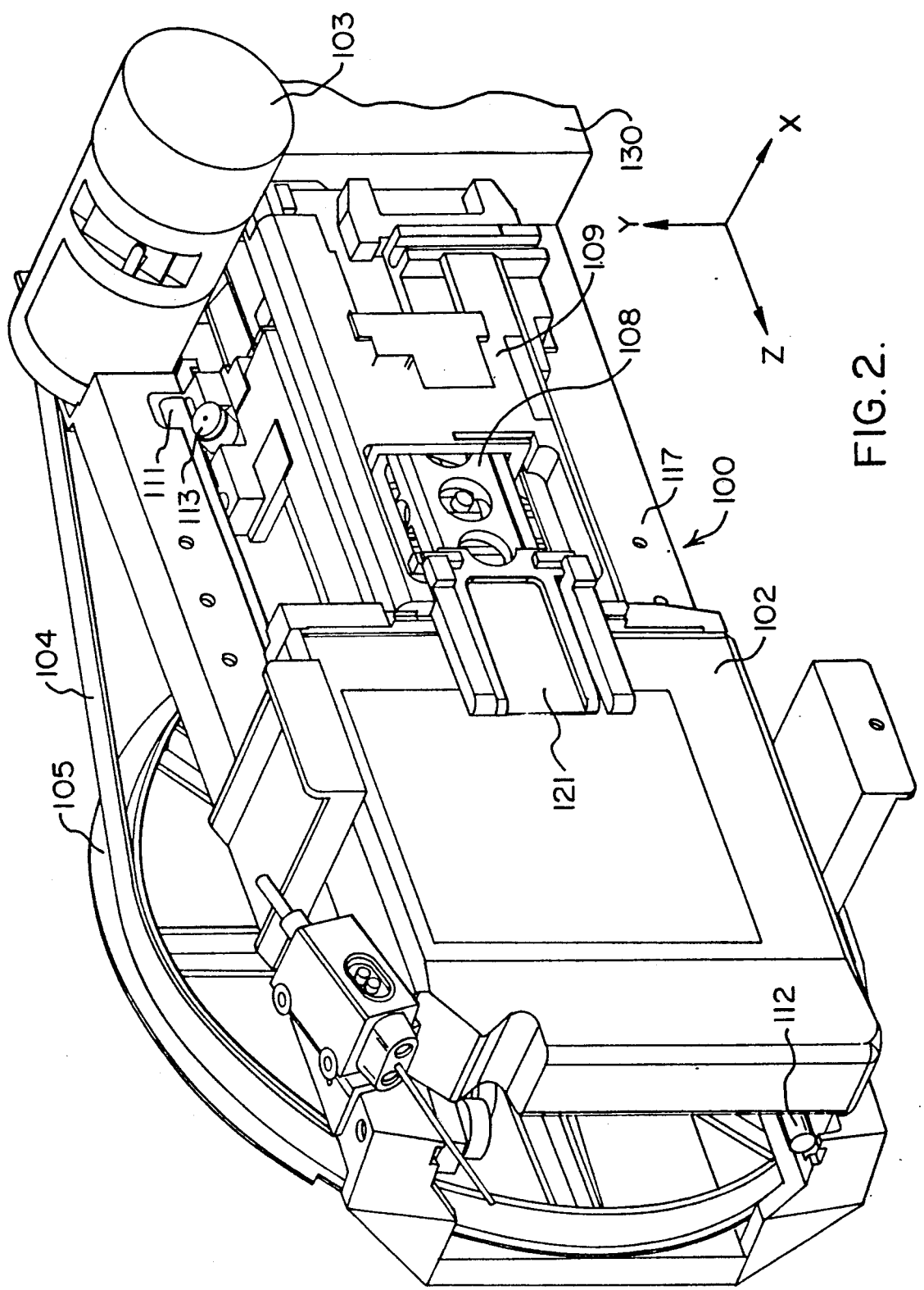
FIGS. 2 and 3 illustrate perspective side views of the gripper hand mechanism of the present invention with the gripper retracted and extended, respectively.
Figure 3:
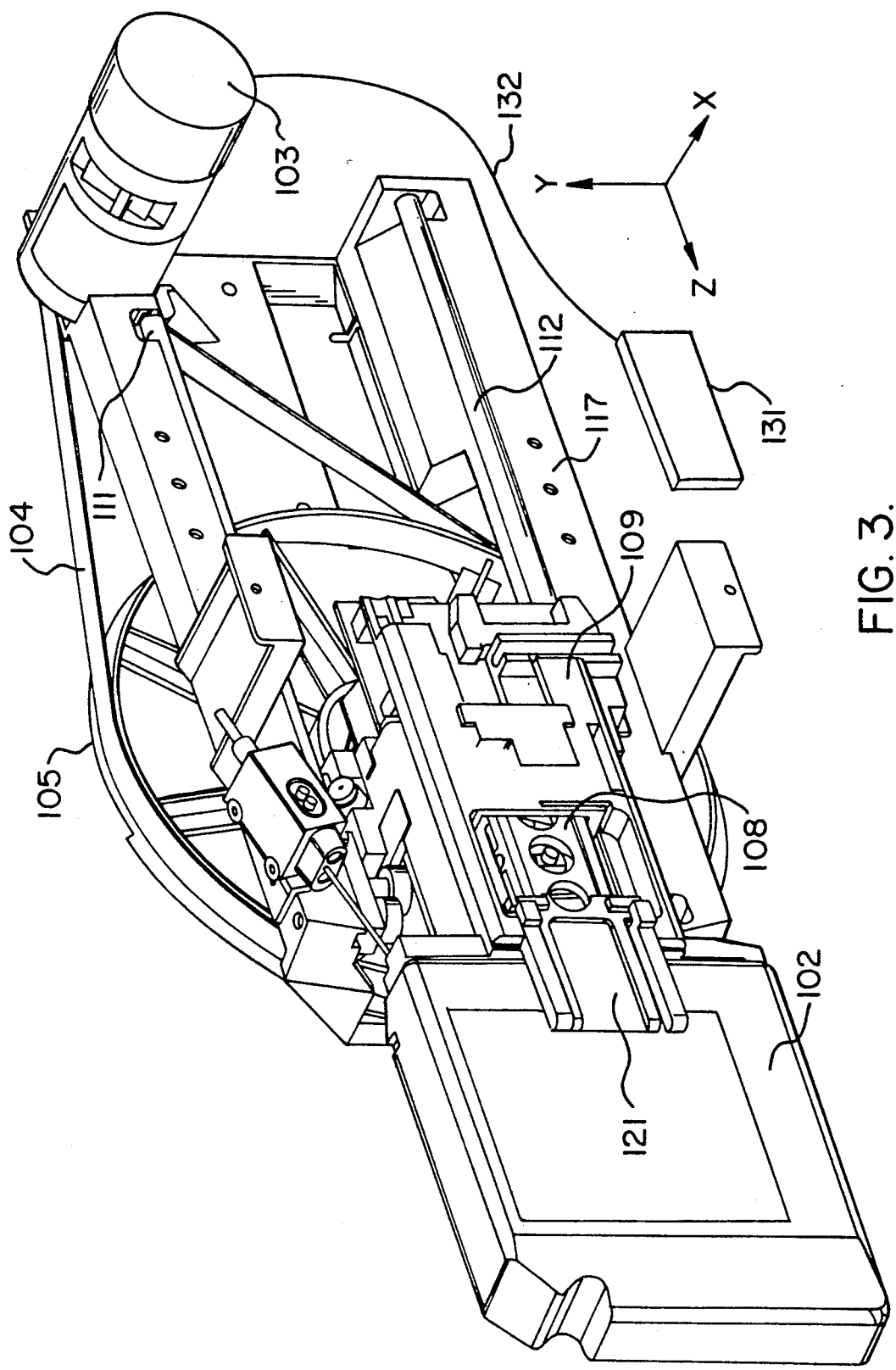

FIGS. 1-5 illustrate the preferred embodiment of the robotic hand apparatus 100 of the present invention. This robotic hand apparatus 100 is used to retrieve objects from object storage locations and, since the preferred embodiment is the use of this apparatus in a magnetic tape cartridge storage system, the term magnetic tape cartridge is substituted for the term object but should not be construed as limiting the scope of this invention. Robotic hand apparatus 100 includes a frame 117 that is attached to the robotic positioning arm 130. Frame 117 supports first and second tracks or rails 111, 112, respectively, each of which consists of a substantially cylindrical rod that substantially extends from one end of frame 117 to the other. A carriage 109 rides on rails 111, 112 via a plurality of rollers 113-115. Rollers 113 ride on rail 111, and rollers 114, 115 ride on rail 112. The use of rollers on a cylindrical track, with the rollers oriented in a triangular arrangement as illustrated in FIG. 1, provides a low friction yet stable carriage/track mechanism with the carriage 109 traversing a path defined by the linear extent of rails 111, 112. Tracks 111, 112 also define a plane in the Cartesian coordinate system illustrated in FIGS. 2 and 3, with this plane being in the x axis and y axis directions as shown therein. Carriage 109 supports a gripper assembly 108 that includes a pair of fingers 121, 122 for grasping a magnetic tape cartridge 102 which is located in a tape cartridge storage location 101. The motion of carriage 109 in the linear direction from its retracted position as illustrated in FIG. 2 to its fully extended position as illustrated in FIG. 3 is accomplished by the carriage transporting apparatus that comprises elements 103-107.

Carriage Transporting Apparatus

The carriage transporting apparatus that performs the robotic hand function is advantageously designed to make use of connecting link 106 which is pivotally attached at second end thereof via pivot 110 to carriage 109. Connecting link 106 is substantially parallel with the plane defined by tracks 111, 112, as is the top surface (radial direction) of crank pulley 105. Connecting link 106 applies a moment to carriage 109 to transport carriage 109 in the linear direction (z axis direction) as a function of the rotation of the other (first) end of connecting link 106, which first end of connecting link 106 is distal from the pivotal connection 110 of the second end of connecting link 106 to carriage 109. The first end of the connecting link 106 in the embodiment illustrated in FIGS. 1-3, is pivotally connected via pivot 107 to a crank pulley 105. Crank pulley 105 is substantially cylindrical in shape and rotates on a pivot shaft 116 located at the center of the pulley 105 and is powered by belt 104 which is driven by drive motor 103. Drive motor 103 includes a shaft 103a, at one end of which is attached a drive gear 103b which engages continuous belt 104. Therefore, as drive motor 103 rotates shaft 103a and the attached drive gear 103b, this causes belt 104 to rotate in the direction R illustrated in FIG. 1, thereby imparting a similarly oriented rotation in crank pulley 105 about its pivot point 116. The rotation of crank pulley 105 causes the pivotal connection 107 of the first end of connecting link 106 to traverse a circle that is coextensive with the circumference of crank pulley 105 and that is parallel with the plane defined by tracks 111, 112. The motion of the pivotal connection 107 of connecting link 106 is defined by the radius of crank pulley 105 as well as the speed of rotation of crank pulley 105.

System Performance

Figure 6:
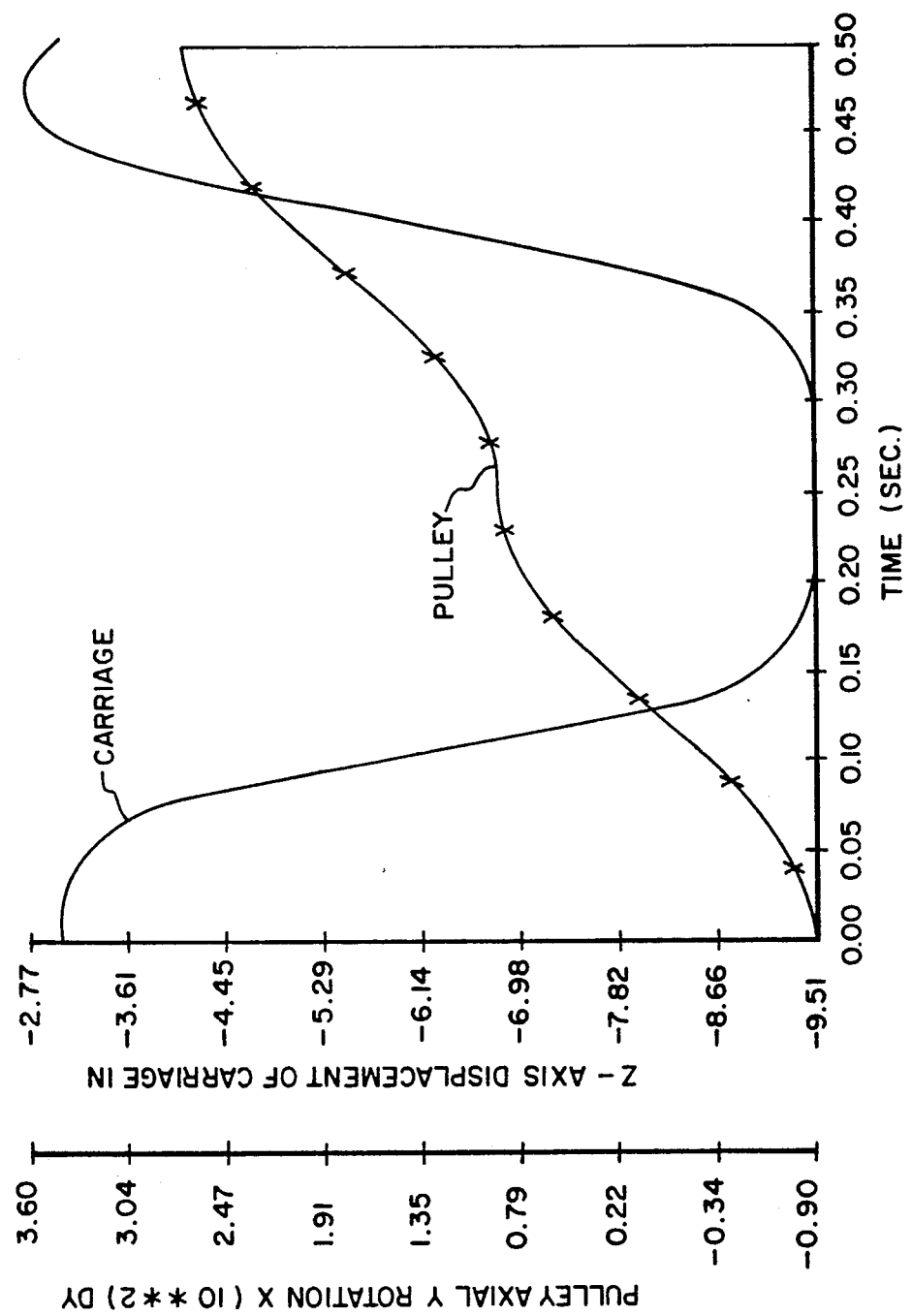
FIG. 6 illustrates a graphical analysis of the angular displacement of the crank pulley and the carriage z axis direction displacement versus time.
Figure 7:
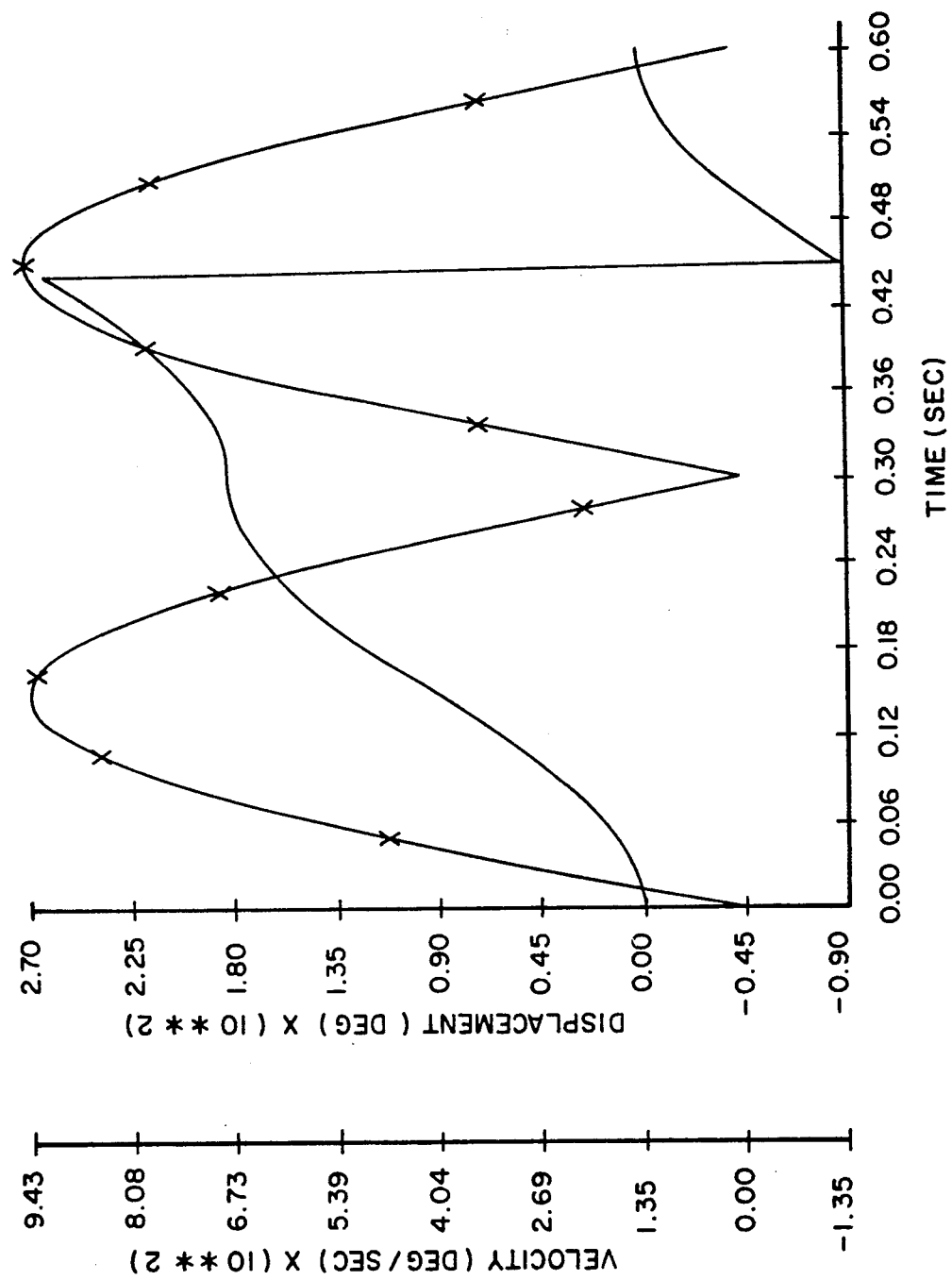
FIG. 7 illustrates a graph of the crank pulley angular displacement and velocity versus time.

In general, drive motor 103 is continuously operated in order to minimize the power necessary to start and stop the mechanism to accomplish a complete cartridge retrieval operation. In addition, the continuous motor and crank motion yields a longer life expectancy for the motor and drive components. FIG. 6 illustrates in graphical form a chart of the angular displacement of crank pulley 105 with respect to time, overlaid on a plot of the z axis displacement of carriage 109 versus time, while FIG. 7 illustrates the crank pulley angular displacement and velocity as a function of time. From these charts, it is obvious that the sinusoidal velocity curve for the carriage 109 implies lower forces in the mechanical linkage with smaller and lighter drive elements and lower power consumption. This enables higher speed and pick and place cycles since the mechanism is of a lighter weight. It is also obvious from these charts that the motor/crank configuration illustrated in these figures provides a pause at the finger gripper mechanism 108 extended position (FIG. 3) in order to provide a predetermined time interval to enable the finger gripper mechanism 108 to grasp the substantially rectangular cartridge 102 that is stored in the selected magnetic tape cartridge storage location 101. Thus, the apparatus illustrated in FIGS. 1-3 provide a pistonlike motion for the finger gripper mechanism 108 that rides on carriage 109. The motive force for drive motor 103 is provided by circuit elements 131, which are typically located in the cartridge storage system 700 at a location that is remote from the robotic hand mechanism 100. Circuit elements 131 are illustrated in FIG. 3 connected via conductors 132 to drive motor 103, which conductors 132 also extend to the gripper assembly 108 in order power the active elements contained thereon.

Finger Gripper Assembly

Figure 4:
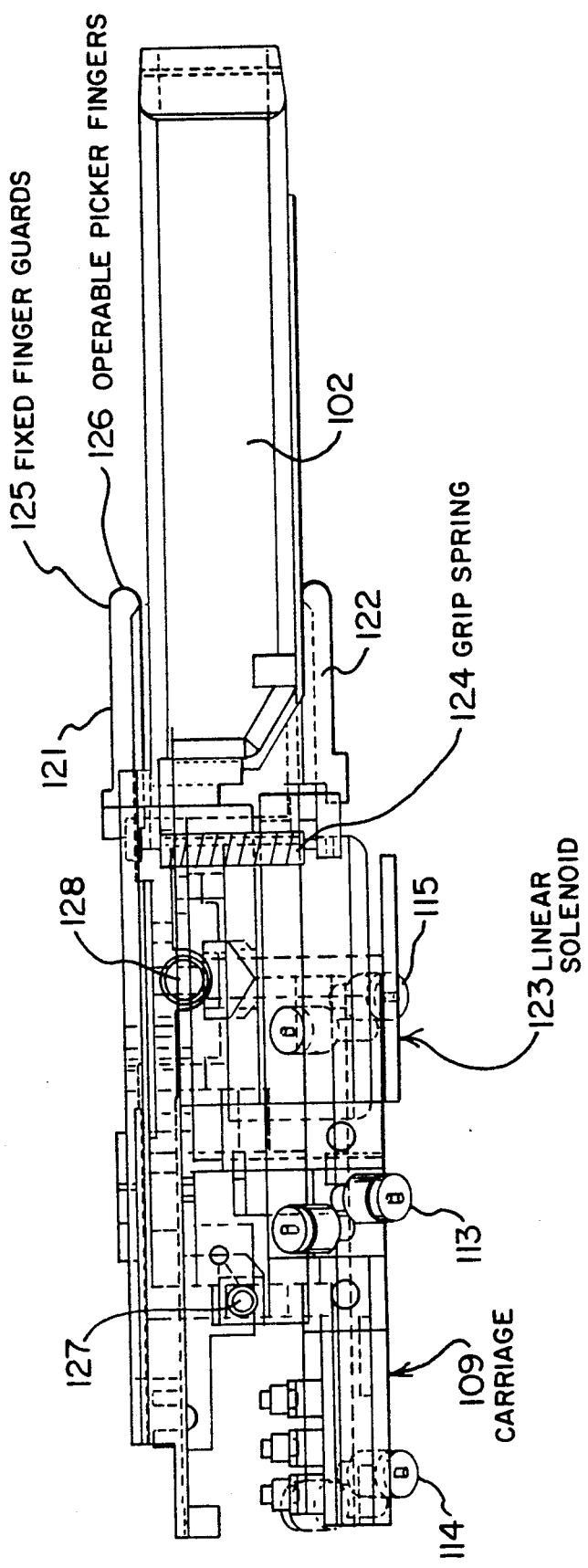
FIG. 4 illustrates a side view of the finger gripper mechanism.

FIG. 4 illustrates a side view of the finger gripper assembly 108 wherein fingers 121 and 122 are shown grasping cartridge 102. Each of fingers 121, 122 includes fixed finger guards 125 in order to protect the active mechanism contained in the fingers 121, 122 as well operable picker fingers 126 which provide the actual cartridge grasping mechanism. The operable picker fingers 126 are activated by linear solenoid 123 which functions to extend grip spring 124 thereby opening fingers 121, 122 from cartridge 102. The linear solenoid 123 operates on center of fingers 121, 122 through gimbal pin 128 located to one side of finger hinge pin 127. Therefore, the action of linear solenoid 123 displacing fingers 121, 122 apart from each other on one side of finger hinge pin 127 causes the same end of fingers 121, 122 to extend grip spring 124 and release cartridge 102. Once the power is removed from linear solenoid 123, grip spring 124 compresses the cartridge end of fingers 121, 122 thereby securely grasping cartridge 102. The circuit boards 131 transmit the drive motor control signals to drive motor 103 to cause the drive motor 103 to rotate crank pulley 105 with the speed and displacement as illustrated in the charts of FIGS. 6 and 7 and to activate linear solenoid 123 at the point in time when carriage 109 has reached its full extent of travel as illustrated in FIGS. 1 and 3, where gripper assembly 108 is in proximate contact with cartridge 102 in selected cartridge storage location 101.

As can be seen from FIGS. 6 and 7, the motion of carriage 109 is paused for a predetermined length of time at the full extent of travel of carriage 109 on tracks 111, 112. During this pause interval, solenoid 123 is deactivated by circuit elements 131 to close fingers 121, 122 on cartridge 102 to securely grasp cartridge 102 for retrieval from object storage location 101. Crank pulley 105 is continuously rotating through a complete circle due to the continuous rotation of the drive shaft 103a of drive motor 103 and therefore operates independent of gripper assembly 108. Gripper assembly 108 securely grasps cartridge 102 and, when the second end of connecting link 106, pivotally connected via pivot 107 to crank pulley 105, traverses the circumference of crank pulley 105 nearest to the object storage location 101 and begins a return travel along rotation path R toward drive motor 103, carriage 109 is again placed in motion, this time to retract toward its fully retracted position, withdrawing cartridge 102 from cartridge storage location 101.

Alternate Embodiment

Figure 5:
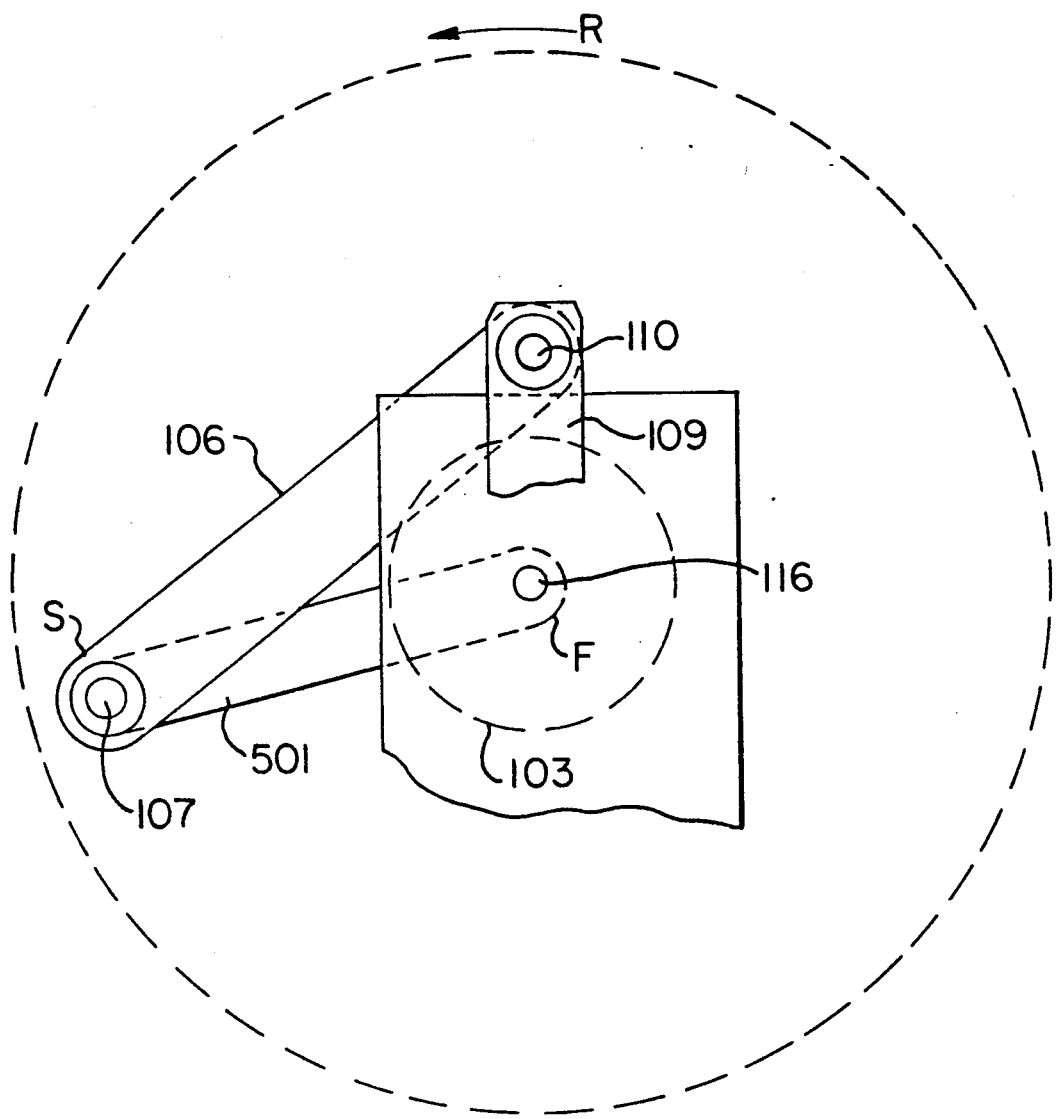
FIG. 5 illustrates an alternative motor and connecting link arrangement.

An alternative motor and connecting link arrangement is illustrated in FIG. 5, wherein the drive motor 103 is located coaxially with pivot point 116 illustrated in FIG. 1. In place of belt 104 and crank pulley 105, a drive arm 501 is pivotally connected 107 to the second end of connecting link 106 while the other end of drive arm 501 is directly connected to the shaft 116 of the motor 103. As the motor shaft 116 rotates, the drive arm 501 rotates along with the motor shaft 116 and the distal end of the drive arm 501 traverses the same circular path (shown in dotted line form in FIG. 5) defined by the circumference of crank pulley 105 as illustrated in FIG. 1. This alternate arrangement imparts the same motion to carriage 109 as described above.

While a specific embodiment of this invention has been disclosed, it is expected that those skilled in the art can and will design alternate embodiments of this invention that fall within the scope of the appended claims.

I claim:

1. In an object handling system that includes a plurality of object storage locations and a robotic manipulator for transporting objects, an object retrieval apparatus, located at an end of said robotic manipulator which positions said object retrieval apparatus opposite a selected one of said object storage locations, for retrieving an object from said selected object storage location, comprising:

means for gripping said object to securely hold said object;

carriage means, having first and second ends, for supporting said gripping means as said carriage means translates along a path of predetermined extent from a first position juxtaposed to said selected object storage location, where said gripping means contacts said object, to a second position in a direction to remove said object from said selected object storage location, when said object retrieval apparatus is positioned opposite said selected object storage location;

first and second track means aligned parallel to each other and parallel to said path, said first and second track means forming a plane in two dimensions of a Cartesian coordinate system, for receiving said first and second ends of said carriage means to guide said carriage means along said path;

means for transporting said carriage means along said first and second track means in said direction, comprising:
connecting link means, having a first end and a second end distal from said first end, which second end is connected to said carriage means for applying a moment to said carriage means in said direction to translate said carriage means along said path, and means, connected to said first end of said connecting link means, for rotating said first end of said connecting link means in a circular motion, parallel with said plane, about a point to impart said moment to said carriage means.

2. The apparatus of claim 1 wherein said rotating means comprises:
a substantially cylindrical pulley means, having a center, a radius that is parallel with said plane and a circumference, said pulley means being rotatably connected at its center to a shaft;
drive means for rotating said pulley means; and
wherein said first end of said connecting link means is pivotally connected to said pulley means at a point proximate said circumference of said pulley means, said connecting link being parallel from said first end to said second end with said plane.

3. The apparatus of claim 2 wherein said drive means comprises:
a motor, having a rotatable shaft;
a drive gear means rotatably connected to said motor shaft;
belt means, forming a continuous loop encircling and engaging said drive gear means and said pulley means; and
wherein said motor shaft rotates said drive gear means, engaging said belt means which translates around said pulley means, rotating said pulley means and said attached first end of said connecting link means.

4. The apparatus of claim 1 wherein said first and second track means each comprise a substantially cylindrical rod to enable a mating one of said first and second ends, respectively, of said carriage means to ride on said first and second track means, respectively.

5. The apparatus of claim 4 wherein said carriage means comprises:
first roller means located at said first end of said carriage means for engaging in rolling contact with said first track means; and
second roller means located at said second end of said carriage means for engaging in rolling contact with said second track means.

6. The apparatus of claim 1 wherein said rotating means comprises:
a motor, having a rotatable shaft; and
arm means, having a first end connected to said motor shaft to rotate in synchronization with said motor shaft and a second end distal from said first end and pivotally connected to said first end of said connecting link means, said connecting link being parallel from said first end to said second end with said plane.

7. The apparatus of claim 1 further comprising:
means for activating said rotating means to rotate substantially uninterruptedly through a substantially complete circle.

8. The apparatus of claim 1 further comprising:
means, responsive to said gripper means substantially reaching said first position, for activating said gripper means to grasp said object stored in said selected object storage location.

9. In an object handling system that includes a plurality of object storage locations and a robotic manipulator for transporting objects, an object retrieval apparatus, located at an end of said robotic manipulator which positions said object retrieval apparatus opposite a selected one of said object storage locations, for retrieving an object from said selected object storage location, comprising:
means for gripping said object to securely hold said object, said gripping means being biased inwardly toward said object;

carriage means, having first and second ends, for supporting said gripping means as said carriage means translates along a path of predetermined extent from a first position juxtaposed to said selected object storage location, where said gripping means contacts said object, to a second position in a direction to remove said object from said selected object storage location, when said object retrieval apparatus is positioned opposite said selected object storage location;

first and second track means aligned parallel to each other and parallel to said path, said first and second track means forming a plane in two dimensions of a Cartesian coordinate system, for receiving said first and second ends of said carriage means to guide said carriage means along said path;

means for transporting said carriage means along said first and second track means in said direction, comprising:
connecting link means, having a first end and a second end distal from said first end, which second end is connected to said carriage means for applying a moment to said carriage means in said direction to translate said carriage means along said path, and means, connected to said first end of said connecting link means, for rotating said first end of said connecting link means in a circular motion, parallel with said plane, about a point to impart said moment to said carriage means;

means for activating said rotating means to rotate substantially uninterruptedly through a substantially complete circle; and means, responsive to said gripping means substantially reaching said first position, for deactivating said gripping means so as to grasp said object stored in said selected object storage location.

10. The apparatus of claim 9 wherein said rotating means comprises:
  a substantially cylindrical pulley means, having a center, a radius that is parallel with said plane and a circumference, said pulley means being rotatably connected at its center to a shaft;
  drive means for rotating said pulley means; and
  wherein said first end of said connecting link means is pivotally connected to said pulley means at a point proximate said circumference of said pulley means, said connecting link being parallel from said first end to said second end with said plane.

11. The apparatus of claim 10 wherein said drive means comprises:
  a motor, having a rotatable shaft;
  a drive gear means rotatably connected to said motor shaft;
  belt means, forming a continuous loop encircling and engaging said drive gear means and said pulley means; and
  wherein said motor shaft rotates said drive gear means, engaging said belt means which translates around said pulley means, rotating said pulley means and said attached first end of said connecting link means.

12. The apparatus of claim 9 wherein said first and second track means each comprise a substantially cylindrical rod to enable a mating one of said first and second ends, respectively, of said carriage means to ride on said first and second track means, respectively.

13. The apparatus of claim 12 wherein said carriage means comprises:
  first roller means located at said first end of said carriage means for engaging in rolling contact with said first track means; and
  second roller means located at said second end of said carriage means for engaging in rolling contact with said second track means.

14. The apparatus of claim 9 wherein said rotating means comprises:
  a motor, having a rotatable shaft; and
  arm means; having a first end connected to said motor shaft to rotate in synchronization with said motor shaft and a second end distal from said first end and pivotally connected to said first end of said connecting link means, said connecting link being parallel from said first end to said second end with said plane.

* * * * *

UNITED STATES PATENT AND TRADEMARK OFFICE
CERTIFICATE OF CORRECTION

PATENT NO. : 5,236,296

DATED : August 17, 1993

INVENTOR(S) : Timothy C. Ostwald

It is certified that error appears in the above-identified patent and that said Letters Patent is hereby corrected as shown below:

Title page, item [75]:
INVENTOR: timothy C. Ostwald should be changed to Timothy C. Ostwald Signed and Sealed this Thirteenth Day of December, 1994

Attest:

BRUCE LEHMAN

*Attesting Officer*  *Commissioner of Patents and Trademarks*